2,951,882

SYNTHESIS OF DIARYLETHANES

Thomas Lawe, Montreal, Quebec, Canada, assignor, by mesne assignments, to American Cyanamid Company, New York, N.Y., a corporation of Maine No Drawing. Filed May 27, 1953, Ser. No. 357,893

19 Claims. (Cl. 260—668)

This invention relates to the process of producing unsymmetrical diarylethanes. More particularly, this invention relates to the production of 1,1-diarylethanes wherein acetylene is reacted with a mono- or di-alkyl substituted benzene in the presence of a sulfuric acid-mercuric compound catalyst system.

The production of diarylethanes by the reaction of acetylene with compounds such as toluene and xylene is known. However, the yield obtained by the known prior art methods is only about 60% based on the acetylene charged into the reaction. In a process such as that disclosed in "Organic Syntheses," Coll. vol. I, 2nd edition, page 229, a reaction mixture is obtained containing six possible isomers, e.g., about 10% of 1,1-bis(4-methylphenyl)ethane, about 90% 1-(2-methylphenyl) 1-(4-methylphenyl) ethane, with the balance being other 1,1-diarylethanes, including some having meta-substitutions. In view of the low yields and generally unsatisfactory results obtained, such a process has not found acceptance in the art.

The objects of my invention are to prepare 1,1-diarylethanes in increased yields by the reaction of acetylene with a compound selected from the group consisting of mono- and di-alkyl-substituted benzenes. A further object of my invention is the production of 1,1-diarylethanes wherein acetylene and a mono- or di-alkyl-substituted benzene is reacted in the presence of a sulfuric acid-mercuric compound catalyst system. These and other objects of my invention will be discussed more fully herein below.

The production of diarylethanes is desired inasmuch as these compounds may be cracked to produce nuclear-substituted styrenes. For example, polymers of methyl and dimethyl styrene possess certain improved physical properties, e.g., high-heat distortion, when compared to polystyrene. However, by the known processes of production of diarylethanes, the cost of operation of the processes has not allowed any significant commercilization of these compounds. The production of diarylethanes by the reaction of acetylene with compounds such as toluene and xylene has not, as previously stated, given satisfactory yields. In another process, for example, the reaction of paraldehyde with toluene or xylene in the presence of hydrogen fluoride, the use of the hydrogen fluoride involves recovery and recycling procedures which tends to detract from the commercial attractiveness of the process and also adds cost to the process. Thus, the process of my invention gives satisfactory commercial yields and is not burdened with the unattractive features of the prior art.

The prior art discloses that mercuric sulfate dispersed in sulfuric acid is a suitable catalyst for the production of diarylethanes when acetylene is reacted with a compound such as toluene or xylene. When a dispersion of mercuric sulfate and sulfuric acid is utilized, vigorous agitation of the reaction mixture must be maintained to avoid settling out of the mercuric salt from the reaction mixture. When any of the mercuric salt settles to the bottom of the reaction vessel, a decreased yield of the diarylethane will be obtained. Another disadvantage of the use of mercuric sulfate dispersed in sulfuric acid is that small particles of the mercuric sulfate stick to the sides of the reactor around which a tarry formation appears. This tar formation also decreases the yields obtained. When a mercuric salt catalyst, e.g., mercuric sulfate, was used in the prior art, no attempt was made to form a solution of the salt in the sulfuric acid even though the salt is inherently soluble to a certain degree. Thus, the catalyst used was primarily a dispersion of the solid salt in sulfuric acid. During the process of the reaction one might introduce additional amounts of the mercuric salt into the reactor to promote the catalytic effect of the sulfuric acid. In that event, it would be necessary to introduce additional amounts of the solid mercuric salt into the reaction vessel. Obviously such a procedure is inconvenient since the reaction must be slowed down or stopped and also there is no assurance that the correct amount of the mercuric sulfate would be ultimately dispersed into the sulfuric acid.

The catalyst employed in the present invention is a sulfuric acid-mercuric compound system, but employed in a manner which makes the mercuric salt much more available than that used in the prior art. I have found that the mercuric compound necessary to promote the catalytic effect of sulfuric acid in the reaction of acetylene with a mono- or dialkyl substituted benzene to produce 1,1-diarylethanes may be dissolved in one of the components of the system and the desired amount of the solution then precisely metered into the reaction mix. When the mercuric compound is in solution, it is then in a more available form than previously used and also it is possible to measure accurately the amount of the mercuric compound that is being introduced into the reaction mix. A further advantage of introducing the mercuric compound in solution into the reaction mixture is that the compound will be easily distributed throughout the reaction mixture and thus more readily available to promote the catalytic effect of the sulfuric acid during the reaction. Any of the liquid components of the system may be employed as the solvent for the mercuric compound. Thus sulfuric acid, toluene, o-, m- or p-xylene, ethyl benzene or any other mono- or dialkyl substituted benzene that is being reacted may be used. Obviously, when a substituted benzene is employed as a solvent for the mercuric compound, that particular substituted benzene will then be reacted with acetylene to form the 1,1-diarylethane. It is also possible to employ water as the solvent for the mercuric compound. When water is used as the solvent, care must be taken so that when the solution of the compound is introduced into the reaction mixture the concentration of the sulfuric acid present is not reduced to below that level at which it effects the reaction desired. Dilute sulfuric acid may also be used as the solvent for the mercuric compound if desired. When a dilute sulfuric acid solution of the mercuric compound is employed, care must also be taken not to reduce the concentration of the sulfuric acid in the reaction mixture below that at which it effects the desired reaction. The solution of the mercuric compound introduced into the solution may be unsaturated, saturated or supersaturated. It is only necessary that the amount of the mercuric compound in the solution be known so that the desired amount of the compound may be accurately and precisely metered into the reaction mixture. By introducing the mercuric compound into the reaction mixture as a solution, it is not necessary to slow or stop the reaction during this addition. Suitable mercuric salts or compounds that find employment in the process of my invention are such as mercuric sulfate, mercuric chloride, mercuric acetate, mercuric oxide, mercuric carbonate, etc. The difficulties previously encountered in the prior art by portions of the catalyst settling to the bottom and sticking to the sides of the reaction vessel are obviated.

In order that those skilled in the art may more fully understand the inventive concept herein described, the preparation of the following sulfuric acid soluble mercuric salt catalyst is set forth for purposes of illustration and not limitation unless otherwise noted in the appended claims. All parts are parts by weight.

CATALYST A

A soluble sulfuric acid-mercuric sulfate catalyst was prepared as follows: 30 parts of mercuric sulfate were dissolved in 100 parts of 15% sulfuric acid. The density of the solution was 1.403/70° F. 0.55 parts of this solution was added slowly to 200 parts of 95% sulfuric acid with stirring. Mercuric sulfate precipitated in a very finely divided form which readily dissolved upon heating the acid to about 130° C. Upon cooling the solution to room temperature, the mercuric sulfate did not reprecipitate.

CATALYST B

A soluble mercuric chloride catalyst was prepared by dissolving mercuric chloride in toluene until a 0.6% solution was obtained.

CATALYST C

A soluble mercuric acetate catalyst was prepared by dissolving mercuric acetate in water until a 20% solution was obtained.

In the process of my invention acetylene is reacted with a compound selected from the group consisting of mono- and di-alkyl substituted benzenes in the presence of a sulfuric acid-mercuric compound catalyst system. It is to be understood that the mercuric compound that is used in the process of my invention is soluble in water or one of the liquid components of the system so that a solution of the catalyst may be added to the reaction mixture. The amount of mercuric compound that is added to the reaction mixture may vary over rather wide limits. The amount of mercuric compound employed is calculated as parts of metallic mercury per part of sulfuric acid. Accordingly, from about 1:2500 to about 1:150 parts of mercuric compound calculated as parts of metallic mercury per part of sulfuric acid may be employed in the process. It is preferred, however, that from about 1:1000 to about 1:333 parts of mercuric compound calculated as parts of metallic mercury per part of sulfuric acid be utilized in the process. The amount of acetylene that is reacted with the substituted benzene may vary from about 15% to about 45% of the theoretical stoichiometric amount of acetylene required to react with said substituted benzene.

By the careful control of the amount of acetylene charged to the reactor, yields greater than 75% based on both the acetylene and substituted benzene are thus obtained. Suitable mono- and di-alkyl substituted benzenes that may be employed in the process of my invention are such as toluene, o-, p-, m-xylenes, ethylbenzene, etc. It is also possible to react long-chain mono- and di-alkyl substituted benzenes in the process of my invention, the only limiting factors being the availability of such substituted benzenes. Sulfuric acid of concentrations varying from about 85% to about 105% may be employed in the instant process. It is preferred, however, that sulfuric acid of concentrations of from about 88% to about 98.5% be employed. I have found that the amount of sulfuric acid that may be used in the process of the invention may vary over rather wide limits. Thus, from about 1 part of sulfuric acid per part of substituted benzene to about 1 part of sulfuric acid to about 25 parts of substituted benzene charged into the reaction vessel may be used. In the use of the sulfuric acid, it is preferred, however, that from about 1:12 to about 1:5 parts of sulfuric acid be employed per part of substituted benzene.

The process of my invention is carried out by charging the desired amount of substituted benzene into a suitable reaction mixture and then cooling to about 5° C. below the desired reaction temperature. Stirring of the substituted benzene is begun and the sulfuric acid is then added thereto. The sulfuric acid may contain the mercuric compound. It is also apparent that the substituted benzene may contain the mercuric compound. If it is desired, the solution of the mercuric compound may be added to the reaction mixture after the substituted benzene and sulfuric acid have been mixed. The reaction may be carried out at a temperature within the range of from about −20° C. to about 70° C. Stirring of the reaction mixture is maintained throughout the reaction. The measured amount of acetylene is then introduced into the reactor either above or below the surface of the substituted benzene over the period necessary to introduce the desired calculated amount. After the acetylene addition is completed, stirring of the reaction mixture is discontinued, the reaction mixture separated and the 1,1-diarylethane recovered therefrom. When the reaction is carried out at a temperature below 0° C., the reaction mixture is more difficult to work up and separation of the acid layer from the 1,1-diarylethane produced is slower. It is, therefore, preferred that a reaction temperature between about 0° C. and about 45° C. be employed in the instant process.

The production of 1,1-diarylethanes by the utilization of sulfuric acid-mercuric compound catalyst systems is illustrated by the following examples which have been set forth by way of illustration and not limitation, unless otherwise noted in the appended claims. All parts are parts by weight.

Example 1

Into a suitable reaction vessel equipped with a thermocouple well, acetylene reservoir, stirrer, inlet tube and a gas exit tube was added a mixture of 1500 parts of toluene and 200 parts of 93.5% sulfuric acid, the latter containing 0.139 part of Catalyst A calculated as parts of metallic mercury. 69.1 parts of acetylene were then added with stirring. An ice-water bath was employed to cool the reaction vessel and maintain an internal temperature of 8–10° C. After the acetylene addition was complete, the reaction mixture was stirred for an additional 5 minutes and 200 parts of water was slowly added with stirring while maintaining the temperature below 15° C. The organic layer was removed and distilled, yielding 1034 parts of recovered toluene and 446.8 parts of ditolylethane. This yield is 80.5% based on acetylene and 84% based on toluene used up.

Example 2

The procedure employed in Example 1 was repeated using 200 parts of 96% sulfuric acid and 1500 parts of toluene containing 0.54 part of Catalyst B calculated as parts of metallic mercury. 44.5 parts of acetylene was used for the amounts previously used. A yield of 1249 parts of toluene and 211.7 parts of ditolylethane was obtained. This yield was 73.8% based on the toluene used and 57.6% based on acetylene.

Example 3

The procedure employed in Example 1 was repeated except 1.48 part of Catalyst C calculated as parts of metallic mercury was substituted for Catalyst A. 58 parts of acetylene were used instead of 44.5 parts used previously. A yield of 1113 parts of toluene and 354.5 parts of ditolylethane was obtained. This yield was 80.2% based on the toluene used up and 75.5% based on acetylene.

The process of my invention may be carried out in a batch or in a multi-stage continuous reactor. When a multi-stage continuous reactor is employed, the amount of acetylene introduced into the reactor will be proportionately charged into the separate stages of the reactor to insure obtaining optimum yield of the 1,1-diarylethane produced. The reaction product will be removed from the last stage of the reactor. The addition of all of the solution of the mercuric compound to the reaction mixture may be made in the first stage of a multi-stage reactor. If it is desired, the solution of the mercuric compound may be added to the various stages of the multi-stage reactor in some reactions.

The 1,1-diarylethanes produced in accordance with my invention may be catalytically cracked in the vapor phase to yield nuclear-substituted styrenes. The processes employed to catalytically crack the 1,1-diarylethanes produced may be carried out in accordance with those disclosed in U.S. Patents Nos. 2,373,982, 2,420,688, 2,420,689, 2,422,163, 2,422,164, 2,422,165, 2,422,169, 2,422,171 and 2,422,318.

I claim:

1. In the process for preparing 1,1-diarylethanes wherein acetylene is reacted with a compound selected from the group consisting of mono- and di-alkyl substituted benzenes in the presence of a sulfuric acid-mercuric compound catalyst system, the improvement which comprises introducing the mercuric compound in solution into the reaction mixture in an amount calculated as parts by weight of metallic mercury per part by weight of sulfuric acid of from about 1:2500 to about 1:150, said sulfuric acid being present in the range of from 1:1 to 1:25 parts by weight per part of said substituted benzene respectively.

2. In the process for preparing 1,1-ditolylethane wherein acetylene is reacted with toluene in the presence of a sulfuric acid-mercuric compound catalyst system, the improvement which comprises introducing the mercuric compound in solution into the reaction mixture in an amount calculated as parts by weight of metallic mercury per part by weight of sulfuric acid of from about 1:2500 to about 1:150, said sulfuric acid being present in the range of from 1:1 to 1:25 parts by weight per part of said toluene respectively.

3. In the process for preparing 1,1-dixylylethane wherein acetylene is reacted with xylene in the presence of a sulfuric acid-mercuric compound catalyst system, the improvement which comprises introducing the mercuric compound in solution into the reaction mixture in an amount calculated as parts by weight of metallic mercury per part by weight of sulfuric acid of from about 1:2500 to about 1:150, said sulfuric acid being present in the range of from 1:1 to 1:25 parts by weight per part of said xylene respectively.

4. In the process for preparing 1,1-di-o-xylylethane wherein acetylene is reacted with o-xylene in the presence of a sulfuric acid-mercuric compound catalyst system, the improvement which comprises introducing the mercuric compound in solution into the reaction mixture in an amount calculated as parts by weight of metallic mercury per part by weight of sulfuric acid of from about 1:2500 to about 1:150, said sulfuric acid being present in the range of from 1:1 to 1:25 parts by weight per part of said o-xylene respectively.

5. In the process for preparing 1,1-di-m-xylylethane wherein acetylene is reacted with m-xylene in the presence of a sulfuric acid-mercuric compound catalyst system, the improvement which comprises introducing the mercuric compound in solution into the reaction mixture in an amount calculated as parts by weight of metallic mercury per part by weight of sulfuric acid of from about 1:2500 to about 1:150, said sulfuric acid being present in the range of from 1:1 to 1:25 parts by weight per part of said m-xylene respectively.

6. In the process for preparing 1,1-di(ethylphenyl)-ethane wherein acetylene is reacted with ethyl benzene in the presence of a sulfuric acid-mercuric compound catalyst system, the improvement which comprises introducing the merucric compound in solution into the reaction mixture in an amount calculated as parts by weight of metallic mercury per part by weight of sulfuric acid of from about 1:2500 to about 1:150, said sulfuric acid being present in the range of from 1:1 to 1:25 parts by weight per part of said ethyl benzene respectively.

7. In the process for preparing 1,1-diarylethane wherein acetylene is reacted with a compound selected from the group consisting of mono- and di-alkyl substituted benzenes in the presence of a sulfuric acid-mercuric compound catalyst system, the improvement which comprises introducing the mercuric compound as a mercuric sulfate acid solution into the reaction mixture in an amount calculated as parts by weight of metallic mercury per part by weight of sulfuric acid of from about 1:2500 to about 1:150, said sulfuric acid being present in the range of from 1:1 to 1:25 parts by weight per part of said substituted benzene respectively.

8. In the process for preparing 1,1-diarylethane wherein acetylene is reacted with a compound selected from the group consisting of mono- and di-alkyl substituted benzenes in the presence of a sulfuric acid-mercuric compound catalyst system, the improvement which comprises introducing the mercuric compound as a mercuric chloride toluene solution into the reaction mixture in an amount calculated as parts by weight of metallic mercury per part by weight of sulfuric acid of from about 1:2500 to about 1:150, said sulfuric acid being present in the range of from 1:1 to 1:25 parts by weight per part of said substituted benzene respectively.

9. In the process for preparing 1,1-diarylethane wherein acetylene is reacted with a compound selected from the group consisting of mono- and di-alkyl substituted benzenes in the presence of a sulfuric acid-mercuric compound catalyst system, the improvement which comprises introducing the mercuric compound as a mercuric acetate aqueous solution into the reaction mixture in an amount calculated as parts by weight of metallic mercury per part by weight of sulfuric acid of from about 1:2500 to about 1:150, said sulfuric acid being present in the range of from 1:1 to 1:25 parts by weight per part of said substituted benzene respectively.

10. In the process for preparing 1,1-ditolylethane wherein acetylene is reacted with toluene in the presence of a sulfuric acid-mercuric compound catalyst system, the improvement which comprises introducing the mercuric compound as a mercuric sulfate sulfuric acid solution into the reaction mixture in an amount calculated as parts by weight of metallic mercury per part by weight of sulfuric acid of from about 1:2500 to about 1:150, said sulfuric acid being present in the range of from 1:1 to 1:25 parts by weight per part of said toluene respectively.

11. In the process for preparing 1,1-dixylylethane wherein acetylene is reacted with xylene in the presence of a sulfuric acid-mercuric compound catalyst system, the improvement which comprises introducing the mercuric compound as a mercuric sulfate sulfuric acid solution into the reaction mixture in an amount calculated as parts by weight of metallic mercury per part by weight of sulfuric acid of from about 1:2500 to about 1:150, said sulfuric acid being present in the range of from 1:1 to 1:25 parts by weight per part of said xylene respectively.

12. In the process for preparing 1,1-di-o-xylylethane wherein acetylene is reacted with o-xylene in the presence of a sulfuric acid-mercuric compound catalyst system, the improvement which comprises introducing the mercuric compound as a mercuric sulfate sulfuric acid solution into the reaction mixture in an amount calculated as parts by weight of metallic mercury per part by weight of sulfuric acid of from about 1:2500 to about 1:150, said sulfuric acid being present in the range of from 1:1 to 1:25 parts by weight per part of said o-xylene respectively.

13. In the process for preparing 1,1-di-m-xylylethane wherein acetylene is reacted with m-xylene in the presence of a sulfuric acid-mercuric compound catalyst system, the improvement which comprises introducing the mercuric compound as a mercuric sulfate sulfuric acid solution into the reaction mixture in an amount calculated as parts by weight of metallic mercury per part by weight of sulfuric acid of from about 1:2500 to about 1:150, said sulfuric acid being present in the range of from 1:1 to 1:25 parts by weight per part of said m-xylene respectively.

14. In the process for preparing 1,1-di(ethylphenyl)-ethane wherein acetylene is reacted with ethyl benzene in the presence of a sulfuric acid-mercuric compound catalyst system, the improvement which comprises introducing the mercuric compound as a mercuric sulfate sulfuric acid solution into the reaction mixture in an amount calculated as parts by weight of metallic mercury per part by weight of sulfuric acid of from about 1:2500 to about 1:150, said sulfuric acid being present in the range of from 1:1 to 1:25 parts by weight per part of said ethyl benzene respectively.

15. In the process for preparing 1,1-ditolylethane wherein acetylene is reacted with toluene in the presence of a sulfuric acid-mercuric compound catalyst system, the improvement which comprises introducing the mercuric compound as a mercuric chloride toluene solution into the reaction mixture in an amount calculated as parts by weight of metallic mercury per part by weight of sulfuric acid of from about 1:2500 to about 1:150, said sulfuric acid being present in the range of from 1:1 to 1:25 parts by weight per part of said toluene respectively.

16. In the process for preparing 1,1-ditolylethane wherein acetylene is reacted with toluene in the presence of a sulfuric acid mercuric compound catalyst system, the improvement which comprises introducing the mercuric compound as a mercuric acetate aqueous solution into the reaction mixture in an amount calculated as parts by weight of metallic mercury per part by weight of sulfuric acid of from about 1:2500 to about 1:150, said sulfuric acid being present in the range of from 1:1 to 1:25 parts by weight per part of said toluene respectively.

17. In the condensation of acetylene with aromatic hydrocarbon to form diarylethane in the presence of a catalyst comprising sulfuric acid containing mercuric ions, the improvement which comprises employing less than 0.2 weight percent, based on sulfuric acid, of said mercuric ion calculated as mercuric sulfate.

18. In the condensation of acetylene with aromatic hydrocarbons to form diarylethane in the presence of a catalyst comprising sulfuric acid containing mercuric ions, the improvement which comprises employing from 1.0 to 0.1 weight percent, based on sulfuric acid, of said mercuric ion calculated as mercuric sulfate.

19. In the condensation of acetylene with aromatic hydrocarbons to form diarylethane in the presence of a catalyst comprising sulfuric acid containing mercury ions provided by a mercuric compound, the improvement which comprises employing from 1.0 to 0.1 weight percent, based on sulfuric acid, of said mercuric compound calculated as mercuric sulfate.

References Cited in the file of this patent

UNITED STATES PATENTS 2,500,369    McCaubrey et al. _____ Mar. 14, 1950

OTHER REFERENCES

Reilly et al.: J. Am. Chem., vol. 50, page 2564, Sept. 5, 1928.

Reichert et al.: J. Am. Chem. Soc., vol. 45, page 3090 (1923).

UNITED STATES PATENT OFFICE
CERTIFICATION OF CORRECTION

Patent No. 2,951,882                      September 6, 1960

Thomas Lawe

It is hereby certified that error appears in the above numbered patent requiring correction and that the said Letters Patent should read as corrected below.

Column 6, line 9, after "sulfate" insert -- sulfuric --.

Signed and sealed this 25th day of April 1961.

(SEAL)
Attest:

ERNEST W. SWIDER
Attesting Officer

DAVID L. LADD
Commissioner of Patents